(12) United States Patent
Maciejewski et al.

(10) Patent No.: US 8,341,823 B1
(45) Date of Patent: Jan. 1, 2013

(54) METHOD FOR CONNECTING A HEAD WINDOW TO A FRAME

(75) Inventors: Wendell C. Maciejewski, Wakefield, RI (US); Douglas Sasko, North Stonington, CT (US); Gary N. Motin, Waterford, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/248,264

(22) Filed: Sep. 29, 2011

Related U.S. Application Data

(62) Division of application No. 12/454,483, filed on Apr. 30, 2009, now Pat. No. 8,201,813.

(51) Int. Cl.
*B23Q 7/00* (2006.01)
(52) U.S. Cl. .................... 29/559; 269/254 CS; 269/301; 269/309; 269/291; 269/71
(58) Field of Classification Search .................... 269/60, 269/58, 254 CS, 301, 309, 291, 71; 29/559, 29/281.1, 434
See application file for complete search history.

(56) References Cited

U.S. PATENT DOCUMENTS

| 4,406,069 | A | * | 9/1983 | Clement | 33/642 |
| 4,824,066 | A | * | 4/1989 | Smith | 248/500 |
| 5,025,568 | A | * | 6/1991 | Grimes | 33/371 |
| 7,980,540 | B2 | * | 7/2011 | Tanikawa et al. | 269/21 |

\* cited by examiner

*Primary Examiner* — Monica Carter
*Assistant Examiner* — Melanie Alexander
(74) *Attorney, Agent, or Firm* — James M. Kasischke; Michael P. Stanley; Jean-Paul A. Nasser

(57) ABSTRACT

The present invention provides a fixture and method for mounting a head window to a frame for use in a submarine periscope system. The fixture supports the head window during the potting of the head window to the frame. A spring-loaded clamping plate is mountable to a baseplate for relative movement therebetween. The clamping assembly has an oval recessed portion. A plurality of spaced apart feet are formed within the oval. The feet support and are bonded to the head window. Shim stock are placed between the feet to define a critical gap.

1 Claim, 1 Drawing Sheet

METHOD FOR CONNECTING A HEAD WINDOW TO A FRAME

This application is a divisional of pending prior U.S. patent application Ser. No. 12/454,483 filed on 30 Apr. 2009 now U.S. Pat. No. 8,201,813 and claims the benefit under 35 U.S.C. §121 of the prior application's filing date.

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

None.

BACKGROUND OF THE INVENTION (1) Field of the Invention

The present invention relates generally to manufacturing of head windows for submarines and more particularly to a fixture utilized during manufacture of the head window.

(2) Description of the Prior Art

During manufacture of a head window for a submarine periscope system, a critical thickness space should be established between the glass window and the wall of a frame for the glass window. The critical thickness space forms a gap that cushions the head window against sea pressures. Uniform thickness of the critical thickness space is essential.

The following U.S. patents describe various prior art fixtures.

U.S. Pat. No. 3,652,146, issued Mar. 28, 1962, to D. S. George, provides a precision stage assembly for an optical microscope which comprises an outer frame adapted to be rigidly mounted on the main structure of an optical microscope, an inner frame for carrying an X and Y traverse device on which a specimen may be carried, an intermediate frame between the inner and outer frames adjustable relative to the outer frame by a coarse focus drive, and releasable clamping means for rigidly clamping together the intermediate and outer frames, the inner frame being adjustable relative to the intermediate frame by a fine focus control mechanism and the inner frame being located with reference to the intermediate frame such that significant relative movement therebetween is restricted to movement in a vertical direction. The George reference concerns specific application of controlled two axis movement of a stage of a microscope. The third axis is that of the microscope itself. The cited reference does not discuss any kind of process of forming a cushion.

U.S. Pat. No. 4,880,349, issued Nov. 14, 1989, to D. A. Woodward, discloses a ceramic substrate held in position, while being processed, by vacuum. The substrate is positioned on an intermediate plate and held down by a vacuum. The intermediate plate is supported on an air bearing while being moved into correct location on a support member, after which the intermediate plate is held in position by a vacuum. The locating of the intermediate plate can be caused to move into position during movement of the support member to a processing position. As such, the cited reference uses vacuum technology and air bearings to support and position ceramic substrates. The reference does not discuss the means by which positioning is controlled, nor a process for use and fabrication of a cushion.

U.S. Pat. No. 5,280,894, issued Jan. 25, 1994, to Witcraft et al., discloses a fixture which includes a lower base for supporting and protecting the front surface of a semiconductor wafer and a clamp. The lower base has an upper end having a central surface portion recessed from a peripheral surface portion for supporting by means of an O ring the peripheral portion of the front surface of the wafer. The clamp rests on a peripheral portion of the back surface of the wafer with the remaining back surface exposed to the backside etching process. A pin and hole arrangement help align the clamp to the base. Holes in the base equalize pressure on both sides of the wafer.

U.S. Pat. No. 5,400,674, issued Mar. 28, 1994, to Arnone et al., discloses a precision component mounting and positioning apparatus with a frame member and a stage member suspended in the frame member. The frame member is adapted to be mounted on a support surface, and the stage member is adapted to receive a precision component, typically a precision optical component such as an optical fiber or waveguide. The stage member can be positionally adjusted relative to the frame member in five degrees of freedom. Three axially oriented actuators are grounded in the frame member to provide for selectively rotating the stage member about two orthogonally disposed transverse axes relative to the frame member as well as for axially translating the stage member relative to the frame member. A pair of orthogonally opposed transverse actuators are grounded in the frame member and oriented to provide for transverse translation of the stage member relative to the frame member.

U.S. Pat. No. 5,513,594, issued May 7, 1996, to McClanahan et al., discloses an apparatus for releasably clamping a substrate to a support platform, or other support system, at a face of the substrate. In one embodiment, a retractable clamp holds a substrate near its edges on a support platform when the clamp is in its fully extended position. One or more leaf springs are mounted to the clamp and apply force to the substrate at respective points in the event the substrate adheres to the clamp, thereby releasing the substrate from the clamp. In a preferred embodiment of the present invention, one or more activators are positioned in cooperative relationship to the leaf springs to cause the leaf springs to retract into recesses in the clamp when the clamp is extended against the substrate. In their retracted position, the leaf springs do not contact the substrate so as to minimize the generation of particle contamination and the chance of the release leaf springs themselves adhering to the substrate. As such, the cited reference does not contain any position control devices nor does the reference discuss a process of use and application.

U.S. Pat. No. 6,231,038, issued May 15, 2001, to Keyser et al., discloses a clamp ring assembly for securing a generally circular workpiece to a supporting surface with an annular base ring having a radial inner surface of a predetermined diameter and at least one locking member. The base ring further includes at least one opening extending axially therethrough for securing the base ring to the supporting surface. An annular securing ring having a radial outer surface and a radial inner surface is provided. The diameter of the outer surface of the securing ring is the same as or slightly smaller than the diameter of the inner surface of the base ring and the securing ring includes at least one locking member for engaging the locking member of the base ring when the securing ring is assembled with the base ring. The securing ring also includes at least one workpiece engaging member for engaging and holding the workpiece against the supporting surface.

As such, the cited reference does not contain any position control devices nor does the reference discuss a process of use and application.

U.S. Pat. No. 6,553,644, issued Apr. 29, 2003, to Karmaniolas et al., discloses processing workpieces utilizing a frame and a fixture. The frame has a perimeter with an opening, and inner and outer side walls. A pair of shelves is located in the opening for supporting a workpiece and a spring retains the workpiece on the frame. The fixture has work locations with elevators that are moved by an elevator handle. The fixture also has an engagement handle for actuating the springs. The workpieces may be simultaneously mounted to or removed from the frames with the fixture. The frames are loaded into the locations and both handles are rotated to raise the elevators and bend the springs. The workpieces are then placed on top of the elevators and the elevator handle is rotated to lower the workpieces. Next, the engagement handle is rotated to release the springs to form assemblies that can be removed from the fixture. As such, the cited reference does not contain any substantive position control.

The above cited prior art does not disclose a suitable fixture for use during construction involving mounting a head window for a periscope system within a suitable frame. Consequently, those skilled in the art will appreciate the present invention that addresses the above and other problems.

SUMMARY OF THE INVENTION

It is therefore a general purpose and primary object of the present invention to provide an improved head window potting fixture and method of use.

It is a further object of the present invention to establish a uniform critical thickness space between a glass window and wall of the frame.

It is a still further object of the present invention to provide a procedure whereby once a critical gap is established, the window and can be removed and reinstalled to the same dimension.

Accordingly, the objects of the present invention are attained by providing a fixture for mounting a head window to a frame for use within a periscope system. Components of the fixture comprise a baseplate and a clamping plate mountable to the baseplate. The clamping plate defines an opening with a plurality of members extending from the clamping plate into the opening.

A plurality of guide members may be utilized to constrain relative movement of the clamping plate with respect to the baseplate for movement in one direction toward and away from the baseplate.

A plurality of gages may be secured to the clamping plate for precise measurement of the relative movement between the clamping plate and the baseplate.

The clamping plate may define a recessed portion around the opening wherein the recessed portion comprises an oval-shaped outer perimeter. The recessed portion may be formed on one side of the clamping plate.

The fixture may comprise a plurality of springs mounted between the clamping plate and the baseplate. The plurality of springs may comprise coiled compression springs positioned around threaded members mounted in the baseplate. A spacer plate may be secured to the baseplate between the baseplate and the clamping plate.

The invention comprises a method for connecting a head window to a frame for use within a periscope system. Steps of the method may comprise connecting a clamping plate to a baseplate for relative movement towards and away from the baseplate wherein the relative movement of the clamping plate is constrained to movement in one direction toward and away from the baseplate.

Method steps may comprise forming an opening in the clamping plate such that the head window is accessible through the opening and/or bonding the head window to the clamping plate whereby the head window and the clamping plate are integral with respect to each other.

After completing the bonding of the head window to the clamping plate, the method might comprise subsequently disconnecting the clamping plate and the head window and removing from the baseplate. Steps may also comprise subsequently reconnecting the clamping plate and the head window to the baseplate.

The method may comprise mounting springs between the clamping plate and the baseplate.

The method may comprise mounting a plurality of gages to the clamping plate to provide measurements of the relative movement between the clamping plate and the baseplate.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
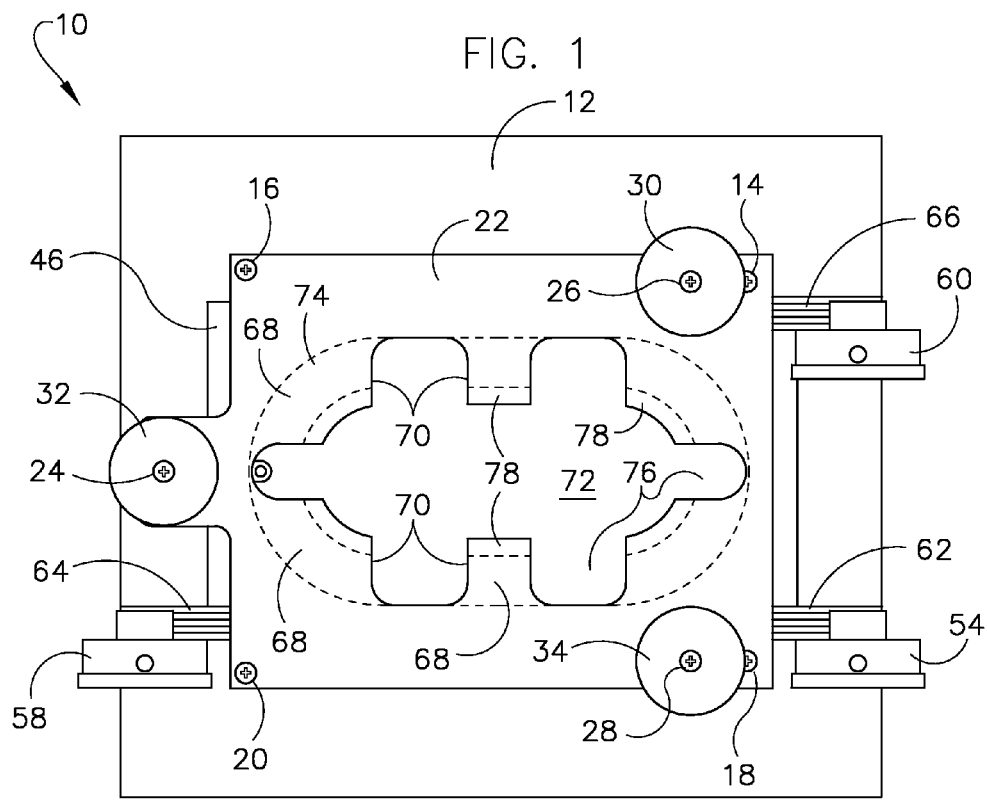
FIG. 1 is an plan view (partially in hidden lines) of a head window fixture in accordance with one embodiment of the present invention.

In one possible embodiment, the present invention is directed to a fixture 10 for providing a mounting foundation for the head window frame and/or to help form a mold for the potting material. The fixture 10 may be utilized to establish a critical thickness space that forms a gap to cushion the head window against sea pressures. In one possible embodiment, the fixture 10 may serve to hold the head window such that once the critical gap is established, then the head window can be removed and reinstalled to the same dimension repeatably. In another possible embodiment of the present invention, the fixture 10 may hold all the components in position until final cure of the potting material is attained.

Baseplate 12 acts as a foundation for the fixture 10 upon which all the relevant components are supported. Clamping plate 22 may be mounted above the baseplate 12. In one possible embodiment, four dowel pins, such as dowel pins 14, 16, 18, and 20 may be pressed into the baseplate 12.

The dowel pins 16 and 18 may be longer than the dowel pins 14 and 20. For example, the dowel pins 14 and 20 might be three inches long, and the dowel pins 16 and 18 might be only two inches long. However, the invention is not limited to the above dimensions. Furthermore, the dowel pins 14, 16, 18, and 20 may be utilized as guide members to ensure that the clamping plate 22 remains parallel to the baseplate 12 at all times during the potting operation. The dowel pins 14, 16, 18 and 20 allow the clamping plate 22 to move freely in a vertical direction with respect to the baseplate 12, but prevent any out of tolerance racking or side to side movement with respect to the baseplate. Other types of guide members, known to those skilled in the art, may also be utilized.

Threaded rods 24, 26, and 28 may be threaded or otherwise secured into the baseplate 12. The threaded rods 24, 26, and 28 are used to support associated knurled knobs 30, 32, and 34. Each threaded rod 24, 26, and 28 may also be utilized to support an assembly of one or more compression springs and/or spacer plates and/or flat washers, and the like.

As one possible example, flat washers such as flat washer 36 may be mounted on the threaded rod 28 beneath the knurled knob 34 and above the clamping plate 22. Another flat washer 38 may be mounted on the threaded rod 28 below the clamping plate 22 and above compression spring 40. Another flat washer 42 may be mounted on the threaded rod 28 between the compression spring 40 and compression spring 44. In this example, the compression spring 44 engages the baseplate 12. The compression springs 40 and 44 may comprise different diameters. Similar or the same assembly of flat washers and compression springs may be utilized with each of the other threaded rods 24 and 26.

The knurled knobs 30, 32, and 34 allow for smooth compression of the clamping plate 22 against the frame when the frame is in position. The springs, such as the springs 40 and 44, provide a resistance against movement of the clamping plate 22 towards the baseplate 12 by biasing the clamping plate in a direction away from the baseplate. When it is time to remove the completed assembly from the fixture 10, the springs force the clamping plate 22 upwardly to allow removal of the completed assembly from the fixture.

Spacer plate 46 is attached to the baseplate 12. The spacer plate 46 may be attached utilizing various means such as screws or other fasteners. In one possible embodiment, the spacer plate 46 is secured to the baseplate 12 utilizing seven screws. Positioning means such as one or more pins may be utilized to accurately position the spacer plate 46 on the baseplate 12.

Figure 2:
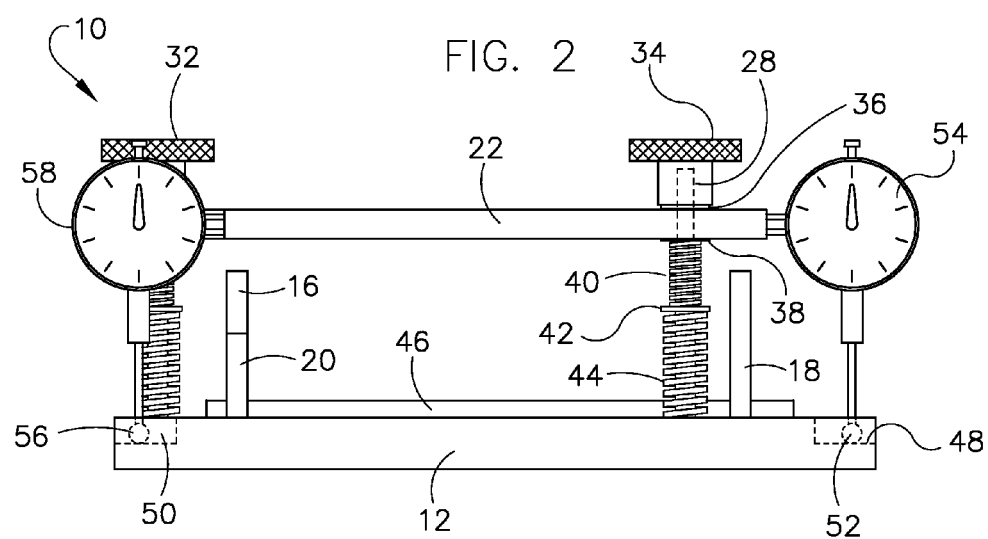
FIG. 2 is an elevational view (partially in hidden lines) of the head window fixture of FIG. 1 in accordance with the present invention with the view taken along reference line 2-2 of FIG. 1.

In one possible embodiment, three recessed sections are provided on the edges of the baseplate 12. FIG. 2 depicts recessed sections 48 and 50. Each recessed section accepts the end of an associated dial indicator. For example, the recessed section 48 accepts end 52 of dial indicator 54. The recessed section 50 accepts end 56 of dial indicator 58. Dial 60 is shown in FIG. 1. Standoffs 62, 64, and 66 may be secured to the clamping plate 22 and utilized to support dials 54, 58, and 60.

An irregular opening 72 is formed through the clamping plate 22, as shown in FIG. 1. The outer dashed lines in FIG. 1 indicate an oval recess perimeter 74 for an oval-shaped recess formed on the lower side of the clamping plate 22. Recessed perimeter 74 is sized and shaped for the head window (not shown). In one possible example, the recessed perimeter 74 may be slightly smaller than the shape of the head window (not shown).

A plurality of inwardly extending members 70 extend inwardly from the recess perimeter 74 within the opening 72. The plurality of inwardly extending members 70 extend into the opening 72 from the recess perimeter 74. The inwardly extending members 70 are spaced from each other around the opening 72 and define a plurality of lobe-shaped openings 76 therebetween. In this example, six inwardly extending members 70 extend inwardly from recess perimeter 74. However, if desired, fewer or more members 70 might be utilized.

Grooves 68 are provided on each inwardly extending member to thereby define head window engagement surfaces or feet 78 along an inner edge of the opening 72. Thus, the head window engagement surfaces or feet 78 are separated from the rest clamping plate 22 by the grooves 68.

In operation, the head window may be positioned between the baseplate 12 and the clamping plate 22. In this embodiment, pairs of springs and flat washers, such as the springs 40 and 44 and the flat washers 38 and 42, may be placed over the threaded rods 24, 26, and 28. The clamping plate 22 is then mounted on the threaded rods 24, 26, and 28. The knurled knobs 30, 32, and 34 may be utilized to lower the clamping plate 22 toward the head window. The dowel pins 14, 16, 18, and 20 constrain movement of the clamping plate 22 to move only vertically with respect to the baseplate 12. Dial indicators 54, 58, and 60 may be utilized to verify and measure the vertical position at three different points on the clamping plate 22. Dial indicators 54, 58, and 60 may be utilized to control movement of the clamping plate 22 during the potting process.

Feet 78 rest on the head window when the head window is in place and provide a means to bond the head window to the clamping plate 22 for removal during the potting process. Thus, one possible use of the opening 72 is to form the feet 78 and thereby optimize a contact area for bonding between the clamping plate 22 and the head window.

In one possible embodiment, shim stock (not shown) or other spacers may be inserted within the recessed portion to locate the head window within the frame and to form the critical gap. The shims are kept in place until the adhesive bond between the head window and the clamping plate 22 has fully cured. Once cured, the head window and the clamping plate 22 become integral to one another. Thus, the head window and the clamping plate 22 can be removed from the guide dowel pins 14, 16, 18, and 20 and the rest of the fixture 10. As well, the head window and the clamping plate 22 can be replaced and still maintain the uniformly spaced gap established by the shims. During the potting process, the shims are not required. Thus, one possible feature of the present invention is the ability of bonding the head window to the clamping plate 22 to permit full disassembly of the fixture 10 without losing the critical gap thickness.

Various types of materials and associated gages and hardware may be utilized with the fixture 10. The fixture 10 may be utilized to pot other head windows with simple modifications to the base 12, spacer plate 46, clamping plate 22 and/or other components.

Advantages of the present invention include the ability to create a controlled space in which a gap of a specific thickness can be created and filled with a potted cushioning material. The present invention includes a fixture and method to control three axes "x" and "y" by virtue of shims and the "z" axis by means of a screw and dial indicator movement. The present invention not only secures the work piece (in this case, a piece of glass—a periscope head window) controls the location and movement of the work; the present application discusses a repeatable process by which a gasket of a controlled thickness can be manufactured.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for connecting a head window to a frame for use within a submarine periscope system, said method comprising the steps of:
   providing a head window;
   providing a frame;

providing a baseplate wherein the baseplate includes at least three sections recessed from a face of the baseplate;

providing a clamping plate defining an aperture and including a recessed portion outside of the aperture wherein the recessed portion comprises an oval-shape shaped for the head window, the recessed portion being formed on one side of the clamping plate opposite the face of the baseplate and the recessed portion having a inner perimeter as an inner edge of the oval shape and an outer perimeter as an outer edge of the oval shape, with the clamping plate including a plurality of feet extending from the outer perimeter into the aperture with each of the feet including a groove having the outer perimeter of the recessed portion as an outer edge of the groove and the inner perimeter of the recessed portion as an inner edge of the groove wherein the head window is capable of access through the aperture and wherein the feet are capable of resting on the head window when the head window is in place and wherein the feet are capable of connecting the head window to the clamping plate;

providing at least three guide members capable of constraining relative movement of the clamping plate with respect to the baseplate for movement toward and away from the baseplate;

providing at least three dial indicator gages secured to the clamping plate with a sensing end of each of the gages extending to each recessed section of the baseplate with the gages operable for measurement of the relative movement between the clamping plate and the baseplate;

connecting the clamping plate to the baseplate;

providing a plurality of springs mounted between the clamping plate and the baseplate;

supporting the head window; and connecting the head window to the clamping plate whereby the head window and the clamping plate are integral with respect to each other.

\* \* \* \* \*